3,600,461
VINYL HALIDE POLYMERIC BLENDS
Yoon Chai Lee, Springfield, Mass., assignor to
Monsanto Company, St. Louis, Mo.
No Drawing. Filed Aug. 5, 1968, Ser. No. 749,942
Int. Cl. C08f 29/24, 37/18, 41/12
U.S. Cl. 260—876R
13 Claims

ABSTRACT OF THE DISCLOSURE

A polymeric blend is prepared from a vinyl halide polymer and an interpolymer of a dicyanobutene-1. The blends exhibit low oxygen permeability and a superior balance of heat resistance and processability while maintaining or improving other properties, including toughness.

BACKGROUND OF THE INVENTION

Vinyl halide homopolymers and copolymers have attained a position of considerable significance in industrial, military and consumer applications. Although the vinyl halide resins exhibit many desirable properties, the balance of properties therein may not be optimum for various applications or processing techniques. Thus, in some cases certain highly desirable processing characteristics are obtained in a given composition at the sacrifice of physical properties of the final product, and vice versa; these factors tend to limit the applications in which vinyl halide resins are useful.

It has been heretofore observed that certain advantages were obtainable in processing by utilizing blends of different vinyl halide polymers. Such blends exhibited desirable flow properties and good physical properties; however, there has been some sacrifice of the most desirable characteristics of the indivdual components. It has also been recognized that vinyl halide copolymers may be produced which have heat resistance properties intermediate the values of homopolymers produced from monomers individually. Such copolymers are often difficult or expensive to produce and generally do not retain all the advantageous properties of the vinyl halide polymers. A particularly significant drawback of many vinyl halide polymers is their lack of adequate resistance to oxygen permeation. This limits their use somewhat and renders them generally unsuitable for applications in which an oxygen barrier is necessary, e.g., as protective films for food and other packaging applications.

Accordingly, it is an object of the present invention to provide novel physical blends of vinyl halide polymers wherein a desirable balance of physical properties and processing characteristics is obtained.

It is also an object to provide vinyl halide polymeric blends exhibiting low oxygen permeability and adapted to use in packaging and other applications as an oxygen barrier.

Another object is to provide novel vinyl halide polymeric blends having outstanding processing characteristics coupled with improved heat resistance.

Still another object is to provide otherwise improved polyvinyl halide blends in which heat resistance is maintained at least at the level of the vinyl halide polymeric component.

A further object is to provide novel blends of vinyl halide polymers from which superior molded and extruded products can be produced conveniently and relatively economically.

SUMMARY OF THE INVENTION

It has now been found that the foregoing and related objects may be readily attained in a blend comprising a vinylhalide polymer and a relatively compatible interpolymer. About 20.0–85.0 weight percent of the interpolymer is a dicyanobutene-1, about 80.0–15.0 percent thereof is monomer copolymerizable therewith, and up to about 20.0 weight percent of the interpolymer is a preformed rubbery polymer forming a substrate upon which the dicyanobutene and copolymerizable monomer are grafted as an interpolymer.

In the blend, there may also be included a rubbery polymer which is not grafted by the dicyanobutene-1 interpolymer, but the total rubbery polymer in the blend should not exceed about 25.0 percent by weight thereof. The vinyl halide polymer may comprise a homopolymer of a vinyl halide, a copolymer thereof with another ethylenically unsaturated monomer, or a post-halogenated polymerized vinyl halide.

DESCRIPTION OF THE PREFERRED EMBODIMENT

As indicated, the blends of the present invention comprise a vinyl halide polymer and an interpolymer of essentially a dicyanobutene-1 and at least one monomer copolymerizable therewith. The blend contains about 3.0–45.0 weight percent of the interpolymer and about 97.0–55.0 percent of the vinyl halide polymer. Preferably, the interpolymer comprises about 5.0–30.0 percent of the blend and most desirably it is about 10.0–20.0 percent thereof, for maximum toughness. In addition to these two essential components, other polymers, impact modifiers, inert fillers, stabilizers, plasticizers, pigments, etc. may be incorporated in the blends.

THE VINYL HALIDE POLYMER

The vinyl halides which are suitable for use in the vinyl halide polymer are vinyl chloride and vinyl fluoride; vinyl chloride is the preferred monomer and may be used alone or in combination with vinyl fluoride and/or another ethylenically unsaturated compound copolymerizable therewith. In the case of a copolymer with another ethylenically unsaturated compound, the amount of comonomer generally does not exceed about 25.0 percent of the weight of the resulting vinyl halide polymer, and preferably the amount of the second component is less than about 15.0 percent of the product.

Ethylenically unsaturated monomers which may be interpolymerized with the vinyl halides include vinylidene halides such as vinylidene chloride; vinyl esters such as vinyl acetate; acrylic and alpha-alkyl acrylic acids such as acrylic and methacrylic acids; the alkyl esters of such acrylic or alkyl-acrylic acids such as methyl acrylate, ethyl acrylate, methyl methacrylate; amides of acrylic and alkyl-acrylic acids such as acrylamide, methacrylamide; unsaturated nitriles such as acrylonitrile, methacrylonitrile, ethacrylonitrile; monovinylidene aromatic hydrocarbons such as styrene and alpha-alkyl styrenes; dialkyl esters of maleic acid such as dimethyl maleate and the corresponding fumarates; vinyl alkyl ethers and ketones; and various other ethylenically unsaturated compounds copolymerizable with the vinyl halides. Mixtures of compounds exemplified by the foregoing materials may also be used to form the vinyl halide polymer.

A portion of the vinyl halide monomer may be grafted onto a rubbery substrate if so desired by reacting one or a mixture of vinyl halide monomers in the presence of a prefromed rubbery polymer. Polyolefins which may be used for this purpose include polyethylene, chlorinated polyethylene, chlorosulfonated polyethylene and similar higher homologs of polyethylene, and ethylene/propylene copolymers, and of considerable value in these blends are interpolymers of the olefins such as ethylene/acrylate and ethylene/vinyl acetate copolymers. Particularly desirable results are obtained when a graft of vinyl chloride upon chlorinated polyethylene or ethylene/vinyl acetate is employed.

Thus, the term "vinyl halide polymer" as used herein includes the graft copolymers as well as the ungrafted vinyl halide homopolymers and copolymers. The term also includes the post-halogenated vinyl halide polymers, such as chlorinated polyvinyl chloride, which derive particular benefit from blending with the interpolymers described, in terms of processability. Although the halogenated polymers normally possess very good heat resistance, their high melt viscosities tend to limit the methods by which they may be fabricated, as a practical matter. The present blends effect a significant reduction in melt viscosity while maintaining the beneficial heat resistance and other properties of these polymers.

The method used to prepare the vinyl halide resins may be any which is commonly practiced in the art; the polymerization may be effected en masse, in solution or with the monomer in aqueous dispersion. From the standpoint of economics and process control, highly suitable polymers can be prepared by a method in which the monomer reactants are suspended in water. Other variations upon the polymerization method may also be utilized in order to vary the properties of the product; e.g., highly fluid resins can be prepared by polymerization at relatively high temperatures to produce polymers of low crystallinity, or by continuously feeding the monomer charge or a portion thereof to the reaction vessel.

THE INTERPOLYMER

The interpolymers which may be blended with the vinyl halide polymers to attain the objects of this invention contain about 20.0–85.0 percent by weight of one or a mixture of butene-1 compounds dicyano-substituted in the 1,3- 1,4- or 2,4-positions. Preferably the amount of the dicyanobutene-1 in the interpolymer is 25.0–60.0 percent by weight thereof. In addition, the interpolymer must contain at least one comonomer and it may optionally contain a rubbery substrate grafted with the interpolymer of the dicyanobutene-1 and copolymerizable monomer.

Although the theory of the invention is not clearly understood, it is believed that the cyanide groups of the disubstituted butene provide a branched structure in which crystallization is inhibited, and also tend to have an immobilizing and stiffening effect upon the polymeric backbone, resulting in a relatively high glass transition temperature for the interpolymer or the graft, where a rubbery substrate is grafted therewith. The high glass transition temperature of the interpolymer effects a rise in that of the vinyl halide polymer composition in which it is blended, producing a blend which is more heat resistant and at the same time more processable. The dicyanobutene-1 interpolymer, even in relatively minor amounts, significantly decreases the oxygen permeability of the vinyl halide polymer by a mechanism which is not completely understood. In addition, other physical properties can be maintained and, in some cases, even improved.

The copolymerizable monomer(s) of the interpolymer may comprise about 80.0–15.0, and preferably about 75.0–40.0 percent, by weight thereof. Exemplary of the monomers copolymerizable with the dicyanobutenes are the unsaturated nitriles (e.g., acrylonitrile, methacrylonitrile ethacrylonitrile, propacrylonitrile, butacrylonitrile); the monovinylidene aromatic hydrocarbons (e.g., styrene; ar-alkylstyrenes such as the o-, m-, and p-methylstyrenes, 2,4-dimethylstyrene, ar-ethylstyrenes, p-t-butylstyrene, etc.; alpha-alkylstyrenes such as alpha-methylstyrene, alpha-ethylstyrene, alpha-methyl-p-methylstyrene. etc.; vinyl naphthalene); ring chlorinated derivatives of the foregoing monovinylidene aromatic hydrocarbons; alkyl (alk)acrylates (e.g., methyl acrylate, ethyl acrylate, propyl acrylate, butyl acrylate, 2-ethylhexyl acrylate, the corresponding alkyl methacrylates, etc.); dialkyl maleates and fumarates (e.g., diethyl maleate, dibutyl fumarate, etc., and mixtures thereof), and mixtures of one or more of the monomers exemplified by the foregoing list may be used. Particularly preferred are the copolymerizable monomers of the group consisting of styrene, alpha-alkyl styrenes, acrylonitrile, methacrylonitrile, methyl methacrylate and mixtures thereof.

A proportion of preformed rubbery polymer, grafted with the monomeric constituents of the interpolymer, may also be incorporated therein by effecting the polymerization of the monomers in the presence of the rubber. From a practical standpoint, the interpolymers of the invention should contain no more than about 20.0 percent by weight of the grafted rubber, and preferably when a rubber is included in the interpolymer it will be present in an amount of about 5.0–12.0 percent. Exemplary of the various rubbers onto which the polymerizable monomers can be grafted during polymerization in the presence thereof to produce the graft copolymers are diene rubbers, natural rubbers, ethylene-propylene terpolymer rubbers, other rubbery olefin polymers such as ethylene-vinyl acetate and ethylene-octyl acrylate, and other acrylate rubbers, polyisoprene rubbers, and mixtures thereof. It will be appreciated that such rubbers include not only homopolymers of the specifically identified constituents but also interpolymers which may be characterized primarily as the aforementioned rubbers.

The preferred substrates, however, are diene rubbers (including mixtures with diene rubbers), i.e., any rubbery polymer (a polymer having a second order transition temperature not higher than 0° centigrade, preferably not higher than −20° centigrade, as determined by ASTM Test D-746-52T) of one or more of the conjugated, 1,3-dienes, e.g., butadiene, isoprene, piperylene, chloroprene, etc. Such rubbers include homopolymers of conjugated 1,3-dienes with up to an equal amount by weight of one or more copolymerizable monoethylenically unsaturated monomers, such as monovinylndene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc.; an alpha-methylstyrene, alpha-ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha-olefins (e.g., ethylene propylene, etc.); pyridines; and the like.

A preferred group of rubbers are those consisting essentially of 75.0–100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile) or mixtures thereof. Particularly advantageous substrates are butadiene homopolymers or interpolymers of 80.0–95.0 percent by weight butadiene and 5.0–20.0 percent by weight of acrylonitrile or styrene.

OPTIONAL COMPONENTS

The blends of the present invention can be comprised solely of the vinyl halide polymer and the incorporated interpolymer and graft copolymers thereof. However, significant advantages are often realized when additional components are also included in the blends. If the interpolymer copolymer is not a graft, it is particularly desirable to admix an impact modifier with the other two components to further improve the physical properties of the products produced from the blends, such as toughness, even though desirable physical improvements may be obtained simply by blending the interpolymer with the vinyl halide polymer. Although ungrafted olefin polymers may be used as the impact modifier such as chlorinated polyethylene, chlorosulfonated polyethylene and ethylene-vinyl acetate copolymers, generally diene rubber grafts of the ABS (styrene and acrylonitrile grafted upon a rubber diene substrate) and MBS (styrene and methyl methacrylate grafted upon a rubbery diene substrate) types are preferable.

Regardless of the source or mode of introduction of the rubbery polymer, the total amount thereof should not exceed 25.0 percent of the total weight of the blend, and preferably not more than 15.0 percent. However, in order to obtain desirable impact modification, it is generally necessary to incorporate at least about 0.7 percent by weight thereof, and preferably at least 3.0 percent.

Other optional additives may also be included in the blends of the invention, such as fillers, plasticizers, stabilizers, lubricants and processing aids. Such additives may or may not be desirable, depending upon the characteristics of the blend and upon the optimum balance between economy and properties which can be attained thereby.

BLENDING TECHNIQUES

The blends of the present invention may be prepared by any of the conventional processing techniques and the design of the apparatus used therefor may vary considerably. It is possible to initially blend the components utilizing suitable equipment, such as a Banbury mixer, mill rolls, etc., to form a preliminary blend, which is then divided and utilized as a feedstock for an extruder or other forming apparatus. Alternatively, the blend may be formed directly in an extruder without any preliminary processing, in which case both the interpolymer and the vinyl halide polymer are advantageously introduced as a powder or other particulate form. The conditions of molding or extrusion are generally the same as those which are used for comparable polymers, the processing temperature of the stock normally being in the range of about 150–220° and preferably about 170–200° centigrade. However, these factors will depend somewhat upon the components and resultant blend properties, and, for example, higher processing temperatures will normally be used if the vinyl halide polymer is, or includes a significant amount of, a halogenated vinyl halide.

Exemplary of the efficacy of the present invention are the following specific examples wherein all parts and percentages are on a weight basis unless otherwise specified.

EXAMPLE 1

Dry formulations are prepared by admixing about 100 parts of polyvinyl chloride (PVC), about 2.5 parts of commercial tin stabilizers, about 1.25 parts of a lubricant and varying amounts of a compatible dicyano butene interpolymer. The polyvinyl chloride has a glass transition temperature of about 72° centigrade and an Izod impact value of about 0.6 foot pounds per inch of notch. The interpolymer is prepared by polymerizing about 38 parts 2,4-dicyanobutene-1 and about 62 parts styrene in the presence of about 17.5 parts of a preformed butadiene/acrylonitrile (80/20) copolymer rubber.

The formulations are mill rolled at 150–165° centigrade for five minutes after fusion occurs, following which the blends are removed from the rolls and allowed to solidify. The solidified blends are then ground and compression molded to produce specimens for testing. Blend A contains about 5.3 parts of the interpolymer; Blend B contains about 11.1 parts thereof; and Blend C contains about 25.0 parts thereof. For comparison, a standard is also prepared, omitting only the interpolymer, and this material is designated Blend D.

The glass transition temperature of each of the blends is determined, and the Izod impact values of blends B, C and D are measured. In addition, the level of clarity of each specimen is evaluated. Table 1 presents the resulting data as to the evaluation of the several blends.

TABLE 1

| Specimen | Parts by weight | | $T_g$, °C. | Izod impact, ft. lbs./in. notch | Clarity |
|---|---|---|---|---|---|
| | PVC | Interpolymer | | | |
| A | 100 | 5.3 | 74 | | Excellent. |
| B | 100 | 11.1 | 75.5 | 3.5 | Do. |
| C | 100 | 25.0 | 78 | 8.0 | Clear. |
| D | 100 | | 72 | 0.6 | Excellent. |

In addition to the foregoing data, the oxygen permeability of the blends used for specimens C and D is measured to evaluate the oxygen barrier properties thereof, specimens one mil in thickness and 100 square inches in area being utilized for this purpose. The unmodified blend (Blend D) is found to allow the passage of about 10 cubic centimeters of oxygen during a 24 hour period under ambient conditions. Specimens of the blends of the present invention (Blend C) provide a much more effective barrier, allowing only about 6 cubic centimeters of oxygen to pass under the same conditions. Moreover, each of specimens A, B and C demonstrate better processability, indicated by lower melt viscosities, as compared with specimen D.

EXAMPLE 2

The same polyvinyl chloride, lubricant and stabilizers as were specified in Example 1 are mixed in the same proportions to form a dry formulation, which is then mill rolled for a short time past the fusion point. Thereafter about 30 parts of an interpolymer containing about 46 parts of 2,4-dicyanobutene-1 and 54 parts of acrylonitrile are added, and the mixture is mill rolled for about 3 minutes more.

Specimens prepared from the blend, as in Example 1, exhibit a significantly improved level of processability and an increase in glass transition temperature over the polyvinyl chloride. Furthermore, the oxygen barrier properties of this blend are significantly better than specimen C of Example 1, allowing the passage of only about 4.5 cubic centimeter of oxygen under the same conditions.

EXAMPLE 3

A formulation is prepared as in Example 2, with the exception that about 150 parts of the polyvinyl halide are blended with about 15 parts of a different interpolymer. The interpolymer in this example contains about 25 parts of 2,4-dicyanobutene-1, about 35 parts of methacrylonitrile and about 40 parts of styrene. Improvements in glass transition temperature, resistance to oxygen permeation, and processability are noted in the specimens prepared as compared with the polyvinyl chloride blended without the interpolymer.

EXAMPLE 4

The same formulation as that of Example 2 is prepared, with the addition of about 13 parts of an ABS graft copolymer thereto. Compared to blends of the same polyvinyl chloride from which both the ABS copolymer and the modifying interpolymer are omitted, the glass transition temperature of this blend is comparable and its toughness is much better. Its glass transition temperature is higher and its oxygen permeability is lower than comparable blends from which only the interpolymer is excluded, and there is essentially no sacrifice of processability compared therewith.

EXAMPLE 5

Blend B of Example 1 is prepared with the exception that chlorinated polyvinyl chloride containing about 65 percent by weight of chlorine and having a heat distortion temperature of about 100–102° centigrade under a load of 264 p.s.i. is substituted for the polyvinyl chloride thereof. Specimens of the resulting blend are quite clear, are considerably improved in processability as compared to blends of the chlorinated polyvinyl chloride without the interpolymer, and have a heat distortion temperature of about 104° centigrade.

EXAMPLE 6

A blend having excellent properties is prepared by following the procedure used to prepare Blend C of Example 1, the only difference being substitution of a vinyl chloride/vinyl acetate (85/15) copolymer for the polyvinyl chloride employed therein. The processability and clarity of the resulting blend are outstanding, and the heat resistance and oxygen barrier properties are improved over the values determined for a comparable blend from which the interpolymer is omitted.

Thus, it can be seen that the present invention provides novel physical blends of vinyl halide polymers wherein the physical properties and processing characteristics are well balanced. The desirable processing characteristics are most frequently coupled with improved resistance to heat, but in any event the processability and/or toughness or other properties may be improved without decrease in heat resistance as compared to the unmodified vinyl halide polymer. The gas permeability of the vinyl halide is reduced significantly to provide materials suitable for packaging and other applications. When the interpolymer is added to a high temperature vinyl halide polymer (such as chlorinated polyvinyl chloride) it improves processability while maintaining heat resistance. When it is added to a rubber modified composition, it may counteract the normally depressive effect of the rubbery polymer on heat resistance. The blends provided may be readily molded and extruded to form superior products.

What is claimed is:

1. A vinyl halide polymer blend comprising about 55.0–97.0 weight percent of a vinyl halide polymer and about 45.0–3.0 weight percent of an interpolymer compatible therewith, said vinyl halide polymer being selected from the group consisting of vinyl halide homopolymers, copolymers of vinyl chloride with up to 25 weight percent of another ethylenically unsaturated monomer, and graft copolymers of vinyl halide on preformed rubber polymer, said interpolymer consisting essentially of about 20.0–85.0 weight percent of at least one dicyanobutene-1 compound substituted in the 1,3-, 1,4- or 2,4-positions with cyano groups; about 80.0–15.0 weight percent of at least one copolymerizable monomer selected from the class consisting of alkene nitriles, monovinylidene aromatic hydrocarbons, ring chlorinated derivatives of monovinylidene aromatic hydrocarbons, alkyl (alk) acrylates, dialkyl maleates and dialkyl fumarates; and 0 to about 20.0 weight percent of a preformed rubbery polymeric substrate selected from the group consisting of diene rubbers, natural rubbers, olefin rubbers, acrylate rubbers, and polyisoprene upon which said dicyanobutene-1 and copolymerizable monomer are grafted.

2. The blend of claim 1 wherein about 0.7–25.0 percent based upon the total weight of said blend, of a preformed rubbery polymer, is included.

3. The blend of claim 1 wherein said vinyl halide polymer is polyvinyl chloride.

4. The blend of claim 1 wherein said vinyl halide polymer is chlorinated polyvinyl chloride.

5. The blend of claim 1 wherein said vinyl halide polymer comprises a copolymer of vinyl chloride monomer with 0 to about 25.0 weight percent of said copolymer of another ethylenically unsaturated monomer copolymerizable therewith.

6. The blend of claim 1 wherein said interpolymer consists essentially of about 25.0–60.0 weight percent of said dicyanobutene-1 compound and about 75.0–40.0 weight percent of a copolymerizable monomer selected from the group consisting of styrene, alpha-alkyl styrenes, acrylonitrile, methacrylonitrile, methyl methacrylate, and mixtures thereof.

7. The blend of claim 2 wherein said rubbery polymer is a diene polymer and wherein at least a portion of said interpolymer is grafted upon a portion of said rubbery diene polymer providing up to 20.0 percent of the weight of said interpolymer.

8. The blend of claim 2 wherein said rubbery polymer is an olefin polymer and wherein a portion of said vinyl halide polymer is grafted onto said olefin polymer.

9. The blend of claim 1 wherein said blend comprises about 55.0–95.0 weight percent of a vinyl chloride polymer and about 30.0–5.0 weight percent of said interpolymer, and wherein said interpolymer consists essentially of about 25.0–60.0 weight percent of said dicyanobutene-1 compound; about 75.0–40.0 weight percent of at least one copolymerizable monomer selected from the group consisting of styrene, alpha-alkyl styrenes, acrylonitrile, methacrylonitrile, and methyl methacrylate; and about 5.0–12.0 weight percent of a rubbery diene polymer.

10. The blend of claim 9 wherein said vinyl chloride polymer comprises chlorinated polyvinyl chloride.

11. The blend of claim 9 wherein said vinyl chloride polymer consists essentially of vinyl chloride and about 0–15.0 weight percent thereof of another ethylenically unsaturated monomer copolymerizable therewith.

12. The blend of claim 9 wherein about 0.7–25.0 percent, based upon the total weight of said blend, of a rubbery diene polymer is included.

13. The blend of claim 9 wherein at least a portion of said interpolymer is grafted upon a portion of said rubbery diene polymer providing up to 12.0 percent of the weight of said interpolymer.

References Cited

UNITED STATES PATENTS

| | | | |
|---|---|---|---|
| 3,047,533 | 7/1962 | Calvert | 260—876X |
| 3,053,800 | 9/1962 | Grabowski et al. | 260—876X |
| 3,260,709 | 7/1966 | Nield | 260—898X |
| 3,322,857 | 5/1967 | Coaker et al. | 260—876 |
| 3,322,858 | 5/1967 | Coaker et al. | 260—876 |

FOREIGN PATENTS

| | | | |
|---|---|---|---|
| 722,769 | 11/1965 | Canada | 260—876 |

MURRAY TILLMAN, Primary Examiner

H. ROBERTS, Assistant Examiner

U.S. Cl. X.R.

264—4R, 78.5N, 878R, 879, 880B, 881, 891, 897C, 898